tates Patent Office 3,706,836
Patented Dec. 19, 1972

3,706,836
INSECTICIDAL COMPOSITIONS CONTAINING
2,6,7 - TRIOXA-1-ARSABICYCLO[2.2.2]OCTANE
COMPOUNDS
John F. Deffner, Glenshaw, Pa., assignor to Gulf
Research & Development Company, Pittsburgh, Pa.
No Drawing. Original application Apr. 24, 1969, Ser. No.
819,122, now Patent No. 3,621,044, dated Nov. 16,
1971. Divided and this application Dec. 1, 1970, Ser.
No. 94,630
Int. Cl. A01n 9/00, 9/02
U.S. Cl. 424—297          3 Claims

ABSTRACT OF THE DISCLOSURE

Insecticidal compositions comprise derivatives of 2,6,7-trioxa-1-arsabicyclo[2.2.2]octane and solutions thereof. The 2,6,7-trioxa-1-arsabicyclo[2.2.2]octane compounds are represented by the general formula

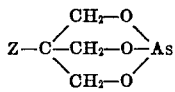

wherein Z can be alkyl, aryl, aralkyl, alkaryl, cycloalkyl, alkoxy, aryloxy, acyl, acyloxy, acyloxymethyl, benzoxymethyl, and chrysanthemumoxymethyl. Examples include 4-propyl-2,6,7-trioxa-1-arsabicyclo[2.2.2]octane
4-acetoxymethyl-2,6,7-trioxa-1-arsabicyclo[2.2.2]octane
4-chrysanthemumoxymethyl-2,6,7-trioxa-1-arsabicyclo
  [2.2.2]octane This application is a division of my copending application Ser. No. 819,122, filed Apr. 24, 1969, and now U.S. Pat. No. 3,621,044.

This invention relates to certain novel derivatives of 2,6,7-trioxa-1-arsabicyclo[2.2.2]octane which are useful as pesticides including insecticides and herbicides.

The derivatives of 2,6,7-trioxa-1-arsabicyclo[2.2.2] octane which are useful according to this invention are represented by the following general formula

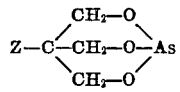

wherein Z is selected from the group consisting of alkyl[$C_mH_{2m+1}$—]; aryl[$C_6H_5$—; $C_{10}H_7$—]; aralkyl [$C_6H_5(CH_2)_n$—]; alkaryl[$CH_3C_6H_4$—; $(CH_3)_2C_6H_3$—]; cycloalkyl[$C_mH_{2m-1}$—]; alkoxy[$C_nH_{2n+1}O$—]; aryloxy [$C_6H_5O$—; $C_{10}H_7O$—]; acyl[$C_nH_{2n+1}CO$—]; acyloxy [$C_nH_{2n+1}COO$—; acyloxymethyl[$C_nH_{2n+1}COOCH_2$—]; benzoxymethyl[$C_6H_5COOCH_2$—]; amino[—$NH_2$]; nitro [—$NO_2$]; nitrobenzoxymethyl[$NO_2C_6H_4COOCH_2$]; ammonium nitrobenzoate

and chrysanthemumoxymethyl

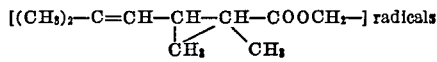

m is an integer of 3 to 8; and n is an integer of 1 to 8.

Specific examples of compounds having the above structural formula are 4-propyl-2,6,7-trioxa-1-arsabicyclo[2.2.2]octane
4-n-butyl-2,6,7-trioxa-1-arsabicyclo[2.2.2]octane
4-tert-butyl-2,6,7-trioxa-1-arsabicyclo[2.2.2]octane
4-n-amyl-2,6,7-trioxa-1-arsabicyclo[2.2.2]octane
4-isoamyl-2,6,7-trioxa-1-arsabicyclo[2.2.2]octane
4-n-hexyl-2,6,7-trioxa-1-arsabicyclo[2.2.2]octane
4-isohexyl-2,6,7-trioxa-1-arsabicyclo[2.2.2]octane
4-n-heptyl-2,6,7-trioxa-1-arsabicyclo[2.2.2]octane
4-n-octyl-2,6,7-trioxa-1-arsabicyclo[2.2.2]octane
4-isooctyl-2,6,7-trioxa-1-arsabicyclo[2.2.2]octane
4-phenyl-2,6,7-trioxa-1-arsabicyclo[2.2.2]octane
4-naphthyl-2,6,7-trioxa-1-arsabicyclo[2.2.2]octane
4-benzyl-2,6,7-trioxa-arsabicyclo[2.2.2]octane
4-phenethyl-2,6,7-trioxa-1-arsabicyclo[2.2.2]octane
4-tolyl-2,6,7-trioxa-1-arsabicyclo[2.2.2]octane
4-xylyl-2,6,7-trioxa-1-arsabicyclo[2.2.2]octane
4-cyclohexyl-2,6,7-trioxa-1-arsabicyclo[2.2.2]octane
4-methoxy-2,6,7-trioxa-1-arsabicyclo[2.2.2]octane
4-isooctyloxy-2,6,7-trioxa-1-arsabicyclo[2.2.2]octane
4-phenoxy-2,6,7-trioxa-1-arsabicyclo[2.2.2]octane
4-naphthoxy-2,6,7-trioxa-1-arsabicyclo[2.2.2]octane
4-acetyl-2,6,7-trioxa-1-arsabicyclo[2.2.2]octane
4-butyryl-2,6,7-trioxa-1-arsabicyclo[2.2.2]octane
4-isooctanoyl-2,6,7-trioxa-1-arsabicyclo[2.2.2]octane
4-acetoxy-2,6,7-trioxa-1-arsabicyclo[2.2.2]octane
4-propionyloxy-2,6,7-trioxa-1-arsabicyclo[2.2.2]octane
4-butyryloxy-2,6,7-trioxa-1-arsabicyclo[2.2.2]octane
4-isooctanoyloxy-2,6,7-trioxa-1-arsabicyclo[2.2.2]octane
4-acetoxymethyl-2,6,7-trioxa-1-arsabicyclo[2.2.2]octane
4-propionyloxymethyl-2,6,7-trioxa-1-arsabicyclo[2.2.2]
  octane
4-butyryloxymethyl-2,6,7-trioxa-1-arsabicyclo[2.2.2]
  octane
4-valeryloxymethyl-2,6,7-trioxa-1-arsabicyclo[2.2.2]
  octane
4-caproyloxymethyl-2,6,7-trioxa-1-arsabicyclo[2.2.2]
  octane
4-isoheptanoyloxymethyl-2,6,7-trioxa-1-arsabicyclo
  [2.2.2]octane
4-isooctanoyloxymethyl-2,6,7-trioxa-1-arsabicyclo
  [2.2.2]octane
4-pelargonyloxymethyl-2,6,7-trioxa-1-arsabicyclo[2.2.2]
  octane
4-isodecanoyloxymethyl-2,6,7-trioxa-1-arsabicyclo[2.2.2]
  octane
4-benzoxymethyl-2,6,7-trioxa-1-arsabicyclo[2.2.2]octane
4-amino-2,6,7-trioxa-1-arsabicyclo[2.2.2]octane
4-nitro-2,6,7-trioxa-1-arsabicyclo[2.2.2]octane
4-p-nitrobenzoxymethyl-2,6,7-trioxa-1-arsabicyclo
  [2.2.2]octane
2,6,7-trioxa-1-arsabicyclo[2.2.2]octyl-4-ammonium p-
  nitrobenzoate
4-chrysanthemumoxymethyl-2,6,7-trioxa-1-arsabicyclo
  [2.2.2]octane The novel derivatives of 2,6,7-trioxa-1-arsabicyclo-[2.2.2]octane which are useful according to this invention are in general, liquid or solid compounds, the solids melting at low or moderate temperatures. They are stable at normal atmospheric conditions of temperature and pressure and can be readily prepared and stored without special precautions for furture use. The novel compounds are found to have insecticidal and herbicidal activity.

The compounds used in the invention can be variously prepared. The $C_3$ to $C_8$ alkyl derivatives of 2,6,7-trioxa- 1-arsabicyclo[2.2.2]octane, for example, can be prepared by reacting arsenic trioxide with the appropriate 1,1,1-tris(hydroxymethyl)alkane. Examples of suitable 1,1,1-tris(hydroxymethyl)alkanes are 1,1,1-tris(hydroxymethyl)butane
1,1,1-tris(hydroxymethyl)pentane
1,1,1-tris(hydroxymethyl)hexane
1,1,1-tris(hydroxymethyl)heptane
1,1,1-tris(hydroxymethyl)octane
1,1,1-tris(hydroxymethyl)nonane The reaction between the 1,1,1-tris(hydroxymethyl)alkane and arsenic trioxide is illustrated by the equation

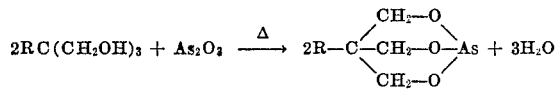

where R is an alkyl group containing from 3 to 8 carbon atoms. The reaction between the arsenic trioxide and the 1,1,1-tris(hydroxymethyl)alkane is preferably conducted in the presence of an inert organic solvent under refluxing conditions. Suitable solvents include benzene, toluene, xylene, chloroform and carbon tetrachloride. Refluxing is continued until the theoretical amount of water is released. The reaction mixture is filtered to remove undesired starting materials. Solvent is then stripped from the filtrate under reduced pressure to produce a residue containing the alkyl derivative of 2,6,7-trioxa-1-arsabicyclo[2.2.2]octane. The desired alkyl derivatives can be recovered and purified according to known techniques including solvent extraction, filtration, recrystallization, sublimation, or the like, dependent upon the nature of the particular compound.

The amino and nitro derivatives of 2,6,7-trioxa-1-arsabicyclo[2.2.2]octane can be prepared by reacting tris(hydroxymethyl)aminomethane and tris(hydroxymethyl)nitromethane, respectively, with arsenic trioxide in the presence of an organic solvent under conditions similar to those used in preparing the $C_3$ to $C_8$ alkyl derivatives of 2,6,7-trioxa-1-arsabicyclo[2.2.2]octane.

The p-nitrobenzoic acid salt of 4-amino-2,6,7-trioxa-1-arsabicyclo[2.2.2]octane can be prepared by a conventional acid base reaction between p-nitrobenzoic acid and 4-amino-2,6,7-trioxa-1-arsabicyclo[2.2.2]octane.

The acyloxymethyl derivatives of 2,6,7-trioxa-1-arsabicyclo[2.2.2]octane can be prepared by reacting 4-hydroxymethyl-2,6,7-trioxa-1-arsabicyclo[2.2.2]octane with the appropriate acid anhydride. Examples of suitable acid anhydrides which can be used are acetic anhydride, propionic anhydride, n-butyric anhydride, n-valeric anhydride, caproic anhydride, enanthic anhydride, caprylic anhydride, pelargonic anhydride and capric anhydride. The reaction of 4-hydroxymethyl-2,6,7-trioxa-1-arsabicyclo[2.2.2]octane with the acid anhydride is illustrated by the equation

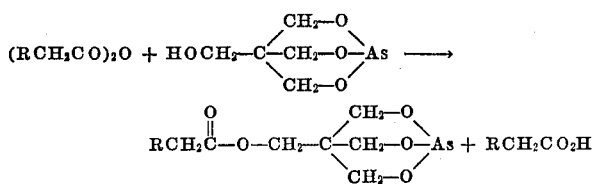

where R is hydrogen or an alkyl group containing from 1 to 8 carbon atoms.

The benzoxymethyl, nitrobenzoxymethyl and chrysanthemumoxymethyl derivatives of 2,6,7 - trioxa - 1-arsabicyclo[2.2.2]octane can be prepared by reacting 4 - hydroxymethyl - 2,6,7 - trioxa - 1 - arsabicyclo[2.2.2]octane with the appropriate carbonyl halide. Examples of suitable carbonyl halides which can be used are benzoyl chloride, nitrobenzoyl chloride and chrysanthemumoyl chloride. The reaction of 4-hydroxymethyl-2,6,7-trioxa-1-arsabicyclo[2.2.2]octane with the carbonyl halide is illustrated by the equation

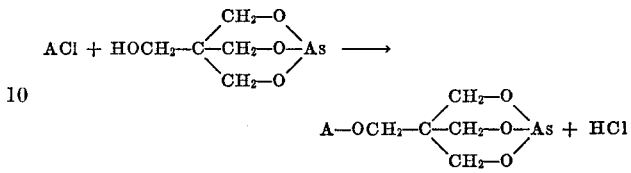

where A is a benzoyl, nitrobenzoyl or chrysanthemumoyl group. The reaction between the carbonyl halide and the 4 - hydroxymethyl - 2,6,7 - trioxa - 1 - arsabicyclo[2.2.2]octane is preferably conducted in the presence of an organic solvent such as benzene, toluene, xylene, chloroform, acetone and carbon tetrachloride. The reaction is accelerated by the use of basic material such as pyridine, triethylamine, sodium hydroxide and the like. The reaction is carried out under reflux conditions which may be at a temperature within the range of about 35° to about 150° C. depending upon the pressure and the particular solvent which is used. The reaction can be conducted at autogenous pressure for a period of about ½ to 24 hours or more. Upon completion of the reaction the product is recovered by removal of the solvent as by vacuum distillation. If desired, purification of the product is effected by repeated recrystallizations from a solvent such as acetone or benzene.

The aryl, aralkyl, alkaryl, cycloalkyl, alkoxy, aryloxy, acyl and acyloxy derivatives of 2,6,7-trioxa-1-arsabicyclo-[2.2.2]octane can be prepared by procedures similar to those described hereinabove.

The following examples illustrate specific procedures by which compounds used in the invention can be prepared.

EXAMPLE I 4-propyl-2,6,7-trioxa-1-arsabicyclo[2.2.2]octane

A mixture of 19.8 grams (0.1 mole) of arsenic trioxide and 29.6 grams (0.2 mole) of 1,1,1-tris(hydroxymethyl)butane dispersed in 120 milliliters of toluene is stirred and refluxed at about 110° C. in a flask connected to a reflux condenser by means of a Dean-Stark trap. Refluxing is continued until the theoretical amount of water (5.4 grams) is collected in the trap. The resulting solution is filtered and concentrated under vacuum to remove the solvent. The crude product (43 grams) is purified by sublimation at 60° C. and 0.1 mm. of mercury pressure. The purified product (35.8 grams) has a melting point of 48.5–49.5° C. The yield is about 81.5% of the theoretical yield. Elemental analysis of the product shows it to compare favorably with the theoretical analysis of 4-propyl-2,6,7-trioxa-1-arsabicyclo[2.2.2]octane.

Percent by weight for 4-propyl-2,6,7-trioxa-1-arsabicyclo[2.2.2]octane.—Found: carbon, 38.25; hydrogen, 5.65. Theoretical: carbon, 38.20; hydrogen, 5.95.

EXAMPLE II 4-nitro-2,6,7-trioxa-1-arsabicyclo[2.2.2]octane

Arsenic trioxide (19.8 grams; 0.1 mole), 1,1,1-tris(hydroxymethyl)nitromethane (30.2 grams; 0.2 mole) and a catalytic amount (0.25 gram) of toluene sulfonic acid are refluxed in toluene as in Example I. The product, after purification, has a melting point of 187° C. Elemental analysis of the product shows it to compare favorably with the theoretical analysis of 4-nitro-2,6,7-trioxa-1-arsabicyclo[2.2.2]octane.

Percent by weight for 4-nitro-2,6,7-trioxa-1-arsabicyclo[2.2.2]octane.—Found: carbon, 22.6; hydrogen, 3.04; nitrogen, 6.89. Theoretical: carbon, 21.6; hydrogen, 2.71; nitrogen, 6.28.

EXAMPLE III

4-amino-2,6,7-trioxa-1-arsabicyclo[2.2.2]octane

Arsenic trioxide (19.8 grams; 0.1 mole) and 1,1,1-tris-(hydroxymethyl)aminoethane (24.2 grams; 0.2 mole) are refluxed in toluene as in Example I. The product, after purification, has a melting point of 87° C. The yield is 75% of the theoretical yield. Elemental analysis of the product shows it to compare favorably with the theoretical analysis of 4-amino-2,6,7-trioxa-1-arsabicyclo[2.2.2]octane.

Percent by weight for 4-amino-2,6,7-trioxa-1-arsabicyclo[2.2.2]octane.—Found: carbon, 24.72; hydrogen, 4.13; nitrogen, 7.47. Theoretical: carbon, 24.89; hydrogen, 4.18; nitrogen, 7.26.

EXAMPLE IV

2,6,7-trioxa-1-arsabicyclo[2.2.2]octyl-4-ammonium p-nitrobenzoate

4 - amino-2,6,7-trioxa-1-arsabicyclo[2.2.2]octane (19.3 grams; 0.1 mole) obtained as described in Example III and p-nitrobenzoic acid (16.7 grams; 0.1 mole) are refluxed in tetrahydrofuran. The melting point of the 2,6,7-trioxa-1-arsabicyclo[2.2.2]octyl - ammonium p-nitrobenzoate thus obtained is 105° C.

EXAMPLE V

4-acetoxymethyl-2,6,7-trioxa-1-arsabicyclo[2.2.2]octane

A mixture of 19.8 grams (0.1 mole) of arsenic trioxide and 27.2 grams (0.2 mole) of pentaerythritol dispersed in 100 milliliters of toluene is stirred and refluxed at about 110° C. as in Example I until the theoretical amount of water (5.4 grams) is removed from the reaction mass. The product after purification has a melting point of 102–104.5° C. and comprises 4-hydroxymethyl-2,6,7-trioxa-1-arsabicyclo[2.2.2]octane.

4 - hydroxymethyl-2,6,7-trioxa-1-arsabicyclo[2.2.2]octane (10.4 grams; 0.05 mole) obtained as described above is mixed with 5.1 grams (0.05 mole) of acetic anhydride. The reaction mixture is stirred for 1 hour. A homogeneous solution forms. Anhydrous zinc chloride (0.1 gram) is then added to the solution. The mixture is heated to 90° C. and held within the range of 90 to 100° C. for 3 hours. Acetic acid is removed from the solution under reduced pressure. The residue is sublimed to obtain 6.7 grams of a white crystalline solid having a melting point of 87–90° C. The yield is about 53.6% of the theoretical yield. Elemental analysis of the product shows it to compare favorably with the theoretical analysis of 4-acetoxymethyl-2,6,7-trioxa-1-arsabicyclo[2.2.2]octane.

Percent by weight for 4-acetoxymethyl-2,6,7-trioxa-1-arsabicyclo[2.2.2]octane.—Found: carbon, 33.93; hydrogen, 4.32. Theoretical: carbon, 33.62; hydrogen, 4.43.

EXAMPLE VI

4-benzoxymethyl-2,6,7-trioxa-1-arsabicyclo[2.2.2]octane

4 - hydroxymethyl-2,6,7-trioxa-1-arsabicyclo[2.2.2]octane (10.4 grams; 0.05 mole) obtained as described in Example V is mixed with 200 milliliters of dry benzene and 4.0 grams (0.05 mole) of pyridine. The mixture is stirred and a solution of benzoyl chloride (7.2 grams; 0.05 mole) in 50 milliliters of benzene is added over a 1-hour period. The mixture is refluxed for 2 hours. The reaction mass is cooled and filtered. The filtrate is evaporated under a reduced pressure to remove the solvent whereupon 14.7 grams of a white crystalline solid having a melting point of 132° C. is obtained. The yield of crude product is 94% of the theoretical yield. Elemental analysis of the product shows it to compare favorably with the theoretical analysis of 4-benzoxymethyl-2,6,7-trioxa-1-arsabicyclo[2.2.2]octane.

Percent by weight for 4-benzoxymethyl-2,6,7-trioxa-1-arsabicyclo[2.2.2]octane.—Found: carbon, 45.32; hydrogen, 4.13. Theoretical: carbon, 46.18; hydrogen, 4.20.

EXAMPLE VII

4(p-nitrobenzoxymethyl)-2,6,7-trioxa-1-arsabicyclo[2.2.2]octane 4-hydroxymethyl - 2,6,7 - trioxa-1-arsabicyclo[2.2.2]octane (10.4 grams; 0.05 mole) obtained as described in Example V is mixed with 200 milliliters of dry benzene and 4.0 grams (0.05 mole) of pyridine. The mixture is stirred and a solution of p-nitrobenzoyl chloride (9.3 grams; 0.05 mole) in 50 milliliters of benzene is added over a 1-hour period and thereafter refluxed as in Example VI. The melting point of the 4(p-nitrobenzoxymethyl)-2,6,7-trioxa-1-arsabicyclo[2.2.2]octane thus obtained is 175–176° C. Elemental analysis of the product shows it to compare favorably with the theoretical analysis of 4(p-nitrobenzoxymethyl)-2,6,7-trioxa-1-arsabicyclo[2.2.2]octane.

Percent by weight for 4(p-nitrobenzoxymethyl)-2,6,7-trioxa-1-arsabicyclo[2.2.2]octane.—Found: carbon, 41.4; hydrogen, 3.84; nitrogen, 4.36. Theoretical: carbon, 40.4; hydrogen, 3.39; nitrogen, 3.92.

EXAMPLE VIII

4-chrysanthemumoxymethyl-2,6,7-trioxa-1-arsabicyclo[2.2.2]octane 4-hydroxymethyl - 2,6,7 - trioxa-1-arsabicyclo[2.2.2]octane (10.4 grams; 0.05 mole) obtained as described in Example V is mixed with 200 milliliters of dry benzene and 4.0 grams (0.05 mole) of pyridine. The mixture is stirred and a solution of chrysanthemumoylchloride (9.3 grams; 0.05 mole) in 50 milliliters of benzene is added over a 1-hour period and thereafter refluxed as in Example VI. The crude product obtained in this reaction is a yellow liquid. The product is considered to consist essentially of 4 - chrysanthemumoxymethyl-2,6,7-trioxa-1-arsabicyclo[2.2.2]octane.

As has previously been stated, the 2,6,7-trioxa-1-arsabicyclo[2.2.2]octane compounds constitute a new series of pesticides. Such compounds are found to have insecticidal, herbicidal and plant growth regulant activity. While, obviously, not every compound will have each of these activities, each compound will possess at least one and generally more than one, such activity. The nitrogen containing derivatives are particularly useful as herbicides whereas the non-nitrogen containing derivatives are useful as insecticides.

Although the 2,6,7 - trioxa-1-arsabicyclo[2.2.2]octane compounds have insecticidal properties of their own, the compounds can be used in conjunction with other insecticide toxicants inluding pyrethrins and the like. They may be applied to insects in the form of a spray, a granular solid, dust or powder. The compounds may be dispersed in a suitable extending agent. The compounds may be held in true solution in a suitable solvent or they may be distributed throughout a liquid phase in the form of suspension or emulsions or in the form of particles held in suspension by wetting agents.

The exact concentration of the 2,6,7-trioxa-1-arsabicyclo[2.2.2]octane compounds employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsion or aerosols) the concentration of the 2,6,7-trioxa-1-arsabicyclo[2.2.2]octane compound employed to supply the desired dosage generally will be in the range of 0.001 to 50 percent by weight. When the extending agent is a solid, the concentration of the 2,6,7-trioxa-1-arsabicyclo[2.2.2]octane compound to supply the desired dosage generally will be in the range of 0.1 to 25 percent by weight. More particularly, the compounds are generally used in amounts of about 50 to about 5000 milligrams per 100 milliliters of liquid. In a preferred embodiment, 4-propyl-2,6,7-trioxa-1-arsabicyclo[2.2.2]octane gives excellent insecticidal activity at concentrations in the order of 250 to 1000 milligrams per 100 milliliters of liquid. When used in conjunction with pyrethrins, the compounds may be used in amounts in the order of about 20 to about 2000 milligrams per 100 milliliters of liquid. The most useful proportions of pyrethrins are between about 20 and about 2000 milligrams per 100 milliliters of liquid.

The 2,6,7-trioxa-1-arsabicyclo[2.2.2]octane compounds possess herbicidal activity of a high level, so that an inert carrier is required to obtain uniform distribution on the plants. The compounds may be applied in the form of a spray or a granular solid. When utilized in the form of a spray, the compounds may be dispersed in water along with such auxiliary agents as solvents and surface active agents such as emulsifiers, dispersants or penetrants. When used as a solid, the compounds may be used in conjunction with kaolin to prevent caking and may be compounded with clays, powdered chalk and other suitable solids as inert carriers and pelletized, if desired, to yield granular solid formations. In preparing formulations of this type it is preferred to use a solvent so as to obtain thorough, even distribution on the inert solid. Other suitable carriers include finely-divided talcs and synthetic mineral fillers derived from silica and silicates, for example, synthetic fine silica and synthetic calcium and magnesium silicates. Also magnesium and calcium carbonates can be used.

The amount of active ingredient applied to the area to be protected is sufficient to exert the desired herbicidal action. Different amounts of the active ingredient are suitably applied to achieve a desired result depending upon the extent and nature of weed growth, application procedures and other features. Effective herbicidal action can be obtained by applying the active compound at a rate of about 1 to about 10 pounds per acre, preferably about 5 pounds per acre in most applications. The formulations utilized may contain from 0.5 percent to about 90 percent by weight of active ingredient, depending upon the particular results desired, the method and place of application.

The organic liquids which can be used in preparing solutions, suspensions or emulsions of the 2,6,7-trioxa-1-arsabicyclo[2.2.2]octane compounds include light petroleum fractions such as deodorized naphthas and kerosenes; lubricating oils of light viscosity; aromatic hydrocarbons such as benzene, toluene, xylene and alkyl naphthalenes such as $\alpha$-methyl naphthalene; alcohols such as ethanol, propanol and butanol; ketones such as acetone, methyl ethyl ketone and cyclohexanone; ethers such as isopropyl ether; and halogenated compounds such as carbon tetrachloride, ethylene dichloride and tetrachloroethane. In certain instances, it is advantageous to employ a mixture of organic liquids as the extending agent.

When the 2,6,7-trioxa-1-arsabicyclo[2.2.2]octane compound is supplied as an aerosol, it is convenient to dissolve it in a suitable solvent and disperse the resulting solution in dichlorodifluoromethane or similar chlorofluoroalkane which boils below room temperature at atmospheric pressure.

The insecticidal activity of the 2,6,7-trioxa-1-arsabicyclo[2.2.2]octane compounds is demonstrated by a Primary Immersion Screening Test. When the compound being evaluated shows a marked knockdown in 30 minutes or at least 50 percent dead flies in 24 hours, the compound is further evaluated by a Microdrop Test Method.

Primary immersion screening test.—In accordance with this test, about 40 refrigerated flies are spooned into paper lid cages covered with screen. When the flies recover from refrigeration, they are anesthetized with carbon dioxide and placed on a filter paper in a Buchner funnel. The test compound (125 mg. in solution or suspension in 17.5 ml. of acetone and 7.5 of water [percent wt./vol. =0.5]), is poured on the flies and lightly stirred. In a few seconds air is sucked through the funnel to partially dry the flies. The flies are returned to the test cage. At the end of 30 minutes when the flies recover from the carbon dioxide anesthesia, a determination is made of the number of flies that are immobilized. The result is reported as "percent knockdown." At the end of 24 hours, a determination is again made of the number of flies that are immobilized. The result is reported as "percent dead."

Microdrop test method.—In accordance with the microdrop procedure, the flies (or roaches) which are to be used in the test are first immobilized by placing them for 30 to 40 minutes in a refrigerator at 28° F. The flies are then counted into groups of 25 (roaches are counted into groups of 10) without regard to sex. The twenty-five flies and/or ten roaches are then separately placed in disposable cylindrical cages comprising waxed cardboard containers with a wire screen top. The cardboard con-

TABLE I

| | | Insecticide screening tests | | | | | |
|---|---|---|---|---|---|---|---|
| | | Immersion test, flies | | Microdrop test | | | |
| | | | | Flies | | Roaches | |
| Compound [1] | Percent wt./vol.[2] | Percent knockdown, 30 min. | Percent dead, 24 hrs. | Percent knockdown, 30 min. | Percent dead, 24 hrs. | Percent knockdown, 30 min. | Percent dead, 48 hrs |
| I | 1.0 | | | 100 | 100 | 0 | 100 |
|  | 0.5 | 100 | 100 | 100 | 80 | 0 | 70 |
|  | 0.25 | | | 92 | 40 | 0 | 20 |
| II | 0.50 | 3 | 5 | | | | |
| III | 0.50 | 15 | 28 | | | | |
| IV | 0.50 | 3 | 10 | | | | |
| V | 1.0 | | | 18 | 100 | 0 | 20 |
|  | 0.5 | 100 | 100 | 44 | 88 | 0 | 10 |
|  | 0.2 | | | 24 | 32 | 0 | 10 |
|  | 0.1 | | | 0 | 0 | 0 | 10 |
| VI | 1.0 | | | 2 | 28 | 10 | 0 |
|  | 0.5 | 90 | 100 | | | | |
| VII | 0.5 | 5 | 8 | | | | |
| VIII | 0.5 | 10 | 40 | | | | |

[1] Numbers are to the compound of the working example illustrating the preparation of the compound. The compounds are as follows: I=4-propyl-2,6,7-trioxa-1-arsabicyclo[2.2.2]octane; II=4-nitro-2,6,7-trioxa-1-arsabicyclo[2.2.2]octane; III=4-amino-2,6,7-trioxa-1-arsabicyclo[2.2.2]octane; IV=2,6,7-trioxa-1-arsabicyclo[2.2.2]octyl-4-ammonium p-nitrobenzoate; V=4-acetoxymethyl-2,6,7-trioxa-1-arsabicyclo[2.2.2]octane; VI=4-benozymethl-2,6,7-trioxa-1-arsabicyclo[2.2.2]octane; VII=4-(p-nitro benzoxymethyl)-2,6,7-trioxa-1-arsabicyclo[2.2.2]octane; VIII=4-chrysanthemumoxymethyl-2,6,7-trioxa-1-arsabicyclo[2.2.2]octane.

[2] Percent wt./vol.=$\dfrac{\text{weight of compound in grams}}{100\ \text{ml. of solvent}} \times 100$ tainers are about ½ inch in depth and 3½ inches in diameter. Four or five cages each of which contains 25 flies (or 10 roaches) are placed in a vessel into which is introduced a constant stream of carbon dioxide. After being exposed to carbon dioxide for about eight to ten minutes, the flies and/or roaches are again immobilized. The flies and/or roaches in an immobilized state are removed from the cages and each fly or roach is separately contacted with an acetone or dimethylformamide solution of the test compound. The solution of the test compound is placed in a ¼ cc. tuberculin syringe which is inserted in a microdrop applicator. The microdrop applicator is equipped with a hypodermic needle capable of delivering droplets consisting of one microliter of solution. The droplet is placed on the thorax or abdomen of the anesthetized fly and/or roach. After all the flies and/or roaches in one container have been treated, the screen lid is replaced on the container which is then placed in a storage rack at 82±2° F. At the same time, control evaluations are made with untreated flies and/or roaches and with flies and/or roaches treated only with the solvent. Insecticidal activity of the test compound is expressed as percent knockdown after 30 minutes and percent kill after 24 hours with flies, or 48 hours with roaches. During the twenty-four or forty-eight hour period, the flies and/or roaches are fed by means of a wad of cotton soaked in a 5 percent sugar solution which has been squeezed partially dry; the wad of cotton is placed on the screen lid of the container. After the twenty-four or forty-eight hour period, the flies and/or roaches are examined and the percent of dead flies and/or roaches is recorded.

The insecticidal activities of the 2,6,7-trioxa-1-arsabicyclo[2.2.2]octane compounds evaluated by the above-described tests are summarized in Table I.

As evidenced by the data in Table I, the non-nitrogen containing derivatives of 2,6,7-trioxa-1-arsabicyclo[2.2.2]octane are more effective insecticides than the nitrogen-containing compounds. All of the compounds, however, are effective as post-emergent herbicides. In order to illustrate the post-emergent herbicidal activity of the compounds, aqueous dispersions thereof are applied to various crops. The dispersions comprise water as the principal inert carrier, along with such auxiliary agents as solvents and surface active agents such as emulsifiers, dispersants or penetrants. The following formulation is representative of the water-dispersible type suitable for spray application: 10% active ingredient 35% solvent (approximately 50% xylene and 50% kerosene), and 55% emulsifier (for example Emulphor EL-719, a polyoxyethylated vegetable oil). About 4 to 5 parts of this emulsifiable concentrate are mixed with about 35 parts of water to produce an aqueous dispersion for spray application.

Aqueous dispersions of the compounds prepared as described above were tested on plants from 10 to 18 days after emergence at application rates of 1, 2 and 5 pounds of active ingredient per acre and a spray volume of 60 gallons per acre. Seven days after treatment the plants were observed. The results are shown in Table II. The results are rated as follows:

N=necrosis
G=growth inhibition
0=no effect
1=slight effect (0 to 25% foliage)
2=moderate effect (26 to 75% of foliage)
3=severe effect (76 to 99% of foliage)
4=maximum effect (dead plants)

From the results shown in Table II it can be seen that the compounds are useful for post-emergence treatment of certain crops. For example, 4-propyl-2,6,7-trioxa-1-arsabicyclo[2.2.2]octane has only a slight effect on oats, wheat and grain sorghum and yet eliminates soybeans, cotton, alfalfa, sugar beets and tomatoes. It will be noted that 2,6,7 - trioxa - 1 - arsabicyclo[2.2.2]octyl-4-ammonium p-nitrobenzoate at the rate of 1 pound has no effect on oats and wheat. 4-Benzoxymethyl-2,6,7-trioxa-1-arsabicyclo[2.2.2]octane at the 1- and 2-pound rate has no effect on oats. 4-(p-Nitrobenzoxymethyl)-2,6,7-trioxa-1-arsabicyclo[2.2.2]octane at the 1-pound rate has no effect on radishes. Various special applications of these compounds, taken alone and in combination will be apparent to those who are skilled in the art.

What is claimed is:

1. An insecticidal composition comprising 4-propyl-2,6,7-trioxa - 1 - arsabicyclo[2.2.2]octane incorporated in a liquid selected from the group consisting of a mixture of water and acetone, deodorized naphtha, deodorized kerosene, benzene, toluene, xylene, α-methyl naphthalene, ethanol, propanol, butanol, acetone, methyl ethyl ketone, cyclohexanone, isopropyl ether, carbon tetrachloride, ethylene dichloride, tetrachloroethane and dimethylformamide in a proportion such that said liquid contains about 50 to about 5000 mg. of 4-propyl-2,6,7-trioxa-1-arsabicyclo[2.2.2]octane per 100 ml. of liquid.

2. An insecticidal composition comprising 4-acetoxymethyl - 2,6,7-trioxa-1-arsabicyclo[2.2.2]octane incorporated in a liquid selected from the group consisting of a mixture of water and acetone, deodorized naphtha, deodorized kerosene, benzene, toluene, xylene, α-methyl naphthalene, ethanol, propanol, butanol, acetone, methyl ethyl ketone, cyclohexanone, isopropyl, ether, carbon tetrachloride, ethylene dichloride, tetrachloroethane and dimethylformamide in a proportion such that said liquid contains about 50 to about 5000 mg. of 4-acetoxymethyl-2,6,7-trioxa-1-arsabicyclo[2.2.2]octane per 100 ml. of liquid.

3. An insecticidal composition comprising 4-chrysanthemumoxymethyl - 2,6,7 - trioxa - 1 - arsabicyclo[2.2.2]octane incorporated in a liquid selected from the group consisting of a mixture of water and acetone, deodorized naphtha, deodorized kerosene, benzene, toluene, xylene, α-methyl naphthalene, ethanol, propanol, butanol, acetone, methyl ethyl ketone, cyclohexanone, isopropyl ether, carbon tetrachloride, ethylene dichloride, tetrachloroethane and dimethylformamide in a proportion such that said liquid contains about 50 to about 5000 mg. of 4-chrysanthemumoxymethyl - 2,6,7 - trioxa - 1 - arsabicyclo[2.2.2]octane per 100 ml. of liquid.

References Cited

UNITED STATES PATENTS 2,897,112  7/1959  Harford et al. _____ 424—194

JEROME V. GOLDBERG, Primary Examiner

A. J. ROBINSON, Assistant Examiner

U.S. Cl. X.R.

424—134, 192, 306